United States Patent
Bloch et al.

[15] 3,681,424
[45] Aug. 1, 1972

[54] SECONDARY ALKYL SULFATE DETERGENT PROCESS

[72] Inventors: Herman S. Bloch, Skokie; George E. Illingworth, Arlington Heights; George W. Lester, Palatine, all of Ill.

[73] Assignee: Universal Oil Products Company, Des Plaines, Ill.

[22] Filed: Dec. 26, 1968

[21] Appl. No.: 787,270

[52] U.S. Cl..................................260/460, 260/459
[51] Int. Cl............................................C07c 139/08
[58] Field of Search..............................260/460, 459

[56] References Cited

UNITED STATES PATENTS

| 3,432,567 | 3/1969 | Jones | 260/505 A |
|---|---|---|---|
| 2,326,505 | 8/1943 | Tullenes | 260/460 |
| 2,573,730 | 11/1951 | Rubin | 260/460 |
| 1,998,411 | 4/1935 | Marley | 260/460 |
| 2,308,219 | 1/1943 | Vesterdal et al. | 260/460 |
| 2,616,936 | 11/1952 | Mammen et al. | 260/513 R |

OTHER PUBLICATIONS

Sulfonation and Sulfation, Gilbert et al., Industrial and Engineering Chemistry, 43(9) p. 2044 (1951).

*Primary Examiner*—Leon Zitver
*Assistant Examiner*—L. B. DeCrescente
*Attorney*—James R. Hoatson, Jr. and Robert W. Erickson

[57] ABSTRACT

Secondary-alkyl sulfates are prepared by sulfating a $C_9$—$C_{18}$ sulfatable compound such as a monohalogenated paraffin, monohydroxylalcohol or mono-olefin, in admixture with a $C_9$—$C_{18}$ linear paraffin and neutralizing the acid alkyl-sulfate in admixture with the same paraffin to form a relatively colorless neutralized sec-alkylsulfate. This process is particularly adaptable where a $C_9$—$C_{18}$ n-paraffin stream is partially converted to a sulfatable compound and the unreacted n-paraffin is not readily separable from the resultant sulfatable compound. Thus, the sulfation and neutralization are performed in admixture with the unreacted n-paraffin whereby the paraffin is readily separated from the neutralization product and recycled.

4 Claims, No Drawings

SECONDARY ALKYL SULFATE DETERGENT PROCESS

BACKGROUND OF THE INVENTION

This invention relates to a process for the production of $C_9$—$C_{18}$ secondary-alkyl sulfates. Generally, it is concerned with separating a $C_9$—$C_{18}$ n-paraffin from a hydrocarbon mixture containing the paraffin, converting said paraffin to a sulfatable compound such as a mono-chlorinated paraffin, monobrominated paraffin, mono-hydroxyalcohol or mono-olefin, sulfating the sulfatable compound to form an acid alkyl sulfate, and neutralizing said sulfate. Specifically, this invention relates to sulfating the sulfatable compound in admixture with the unconverted paraffin, neutralizing the acid alkyl sulfate in admixture with the same paraffin, separating, and recycling the paraffin so as to be converted into said sulfatable compound. More specifically, this invention relates to separating the hydrocarbon phase containing $C_9$—$C_{18}$ paraffin and the acid alkyl sulfate from the acid phase produced in the sulfation reaction and neutralizing the hydrocarbon phase, recovering therefrom n-paraffins and neutralized secondary-alkylsulfates of excellent color quality. Further, this invention is concerned with sulfating a $C_9$—$C_{18}$ sulfatable compound in admixture with a $C_9$—$C_{18}$ n-paraffin and neutralizing the resultant alkylsulfate in admixture with the same paraffin to provide a detergent of excellent color quality.

Processes for the production of linear sec-alkylsulfates have gained considerable importance within the last few years because of the world's ever-increasing pollution problem, stemming in part from sewage disposal and longevity of detergents dissolved in the sewage. The presence of detergents in treated sewage stems from the inability of bacteria to degrade the original detergents. When these non-biodegradable detergents are aerated, such as when the treated sewage is discharged into rivers and lakes, large quantities of foam result. Further, the diluted detergent solutions often enter subsurface waters which ultimately feed into the underground water strata serving many communities as a source of water supply. Occasionally, these detergents turn up in sufficient quantities in tap water to cause the water to foam at the tap.

To meet the public's demand for pure water, essential to the future growth and development of cities and the maintenance of human health standards, the petrochemical industry has attempted to solve the problem of foam in sewage disposal plants and rivers through the relatively recent development of biodegradable linear alkyl sulfonates (LAS) to replace the non-biodegradable alkyl benzene sulfonates (ABS). However, about two-thirds of the effluent from the nation's population receives little or no treatment due in part to inferior or overtaxed sewage treatment facilities, or even complete absence of sewage treatment facilities, thereby putting the primary emphasis in detergent development on the rate of degradation of the detergent. An example of such detergents, readily biodegradable in inferior sewage treatment plants or even in situations where sewage treatment is absent, are the linear alkylsulfates, in particular, the sodium linear alkylsulfates.

Generally, these detergents are commercially manufactured by the isolation of $C_9$—$C_{18}$ n-paraffins from mixtures containing the paraffins, utilizing molecular seives or urea adduction, and converting the n-paraffin to a sulfatable compound such as a halogenated paraffin, an olefin or an alcohol, or by cracking saturated paraffin waxes to produce a linear olefin, sulfating the sulfatable compound and neutralizing. In those processes directly converting recovered $C_9$—$C_{18}$ n-paraffins to halogenated paraffins, particularly the monohalogenated chlorides and bromides, or where the paraffin is dehydrogenated to the corresponding mono-olefin, complete conversion of the paraffin is not effected because of undesired side reactions which occur at high conversions. For example, at high halogenation conversions, polyhalogenated compounds are formed which, if sulfated, produce inferior detergents; or, in paraffin dehydrogenation, polyunsaturated compounds result as well as cracked and cyclic products. In effect, as conversion increases, selectivity declines.

The problem then arises of separating the prepared sulfatable compound from its n-paraffin precursor by conventional fractionation techniques since the paraffins that are typically converted are not of a single carbon number but rather of a mixture of carbon numbers within a $C_9$—$C_{18}$ range. What results is an overlap in boiling points between the converted paraffin mixture and the unconverted paraffin mixture. Present prior art processes approach this problem by either intricate fractionation techniques or by utilizing a narrower carbon number range in the paraffin feed. A further problem arises in maintaining a neutralized sec-alkyl sulfate free from discoloration and excessive amounts of inorganic salts such as sodium sulfate. Current processes maintain their production of sec-alkyl sulfates relatively free from discoloration and excessive amounts of inorganic salts through intricate manipulation of the operating variables such as reaction temperature, sulfuric acid purity and strength, acid to sulfatable compound ratio, reaction time, paraffin and/or olefin purity, etc. and overall reaction conversion. In addition, bleaching techniques are often employed to bring the final product up to color specifications.

SUMMARY OF THE INVENTION

Accordingly, it is an object of this invention to provide a new, improved process for the production of $C_9$—$C_{18}$ sec-alkyl sulfates. Specifically, it is an object of this invention to provide a novel means of producing $C_9$—$C_{18}$ linear sec-alkylsulfates from the corresponding n-paraffins without the necessity for intricate means to effect separation of the unreacted paraffin. More specifically, it is an object of this invention to provide a means for producing relatively color-free neutralized sec-alkylsulfates.

In an embodiment, this invention relates to a process for producing a linear sec-alkylsulfate which comprises the steps of: (a) sulfating a linear $C_9$—$C_{18}$ sulfatable compound with a sulfating agent, in admixture with a $C_9$—$C_{18}$ n-paraffin to form a $C_9$—$C_{18}$ alkyl acid sulfuric ester; (b) separating the resultant sulfation mixture into an acid phase and a hydrocarbon phase containing said $C_9$—$C_{18}$ alkyl acid sulfuric ester; (c) neutralizing said hydrocarbon phase to form a $C_9$—$C_{18}$ neutralized alkyl sulfuric ester; and (d) separating from the neutralized hydrocarbon phase the $C_9$—$C_{18}$ n-paraffin and said neutralized alkyl sulfuric ester.

In a more limited embodiment our invention relates to a process for producing linear sec-alkylsulfates which comprises the steps of: (a) separating a $C_9$—$C_{18}$ n-paraffin from a hydrocarbon mixture containing said linear paraffin; (b) dehydrogenating said n-paraffin by contacting it with a dehydrogenation catalyst to form a mono-olefin, recovering therefrom said mono-olefin in admixture with unreacted n-paraffin; (c) sulfating said olefin in admixture with unreacted n-paraffin with a sulfating agent; (d) separating the resultant sulfation step effluent into a hydrocarbon phase containing alkyl acid sulfuric ester and said unreacted n-paraffin and an acid phase; (e) neutralizing said hydrocarbon phase to produce a neutralized alkyl sulfuric ester and separating therefrom, said unreacted n-paraffin and neutralized alkyl sulfuric ester; and, (f) recycling at least a portion of said paraffin to said dehydrogenation step.

In summary, a principal advantage of this invention resides in the ability to produce a relatively color-free $C_9$-$C_{18}$ linear sec-alkyl sulfate by sulfating a sulfatable compound in admixture with $C_9$—$C_{18}$ n-paraffins and neutralizing the hydrocarbon phase of the sulfation reaction. Further advantages of this invention reside in the ability to convert n-paraffins to sulfatable compounds and sulfating such compounds in admixture with the unreacted n-paraffins, thus eliminating intermediate separation of the sulfatable compound from its n-paraffin derivative and providing the ability to operate over a wider carbon number range than has been heretofor available from prior art processes.

DESCRIPTION OF PREFERRED EMBODIMENTS

The $C_9$—$C_{18}$ n-paraffins utilized in this invention may be obtained from any suitable source including an appropriate fraction of a straight run petroleum distillate, and typically, those in the kerosene range; the products of the Fischer-Tropsch reaction, a process by which paraffinic hydrocarbons in the $C_9$—$C_{18}$ range are formed by the reaction of hydrogen with carbon monoxide; the hydrogenated products of ethylene polymerization; and the hydrogenated fatty acids which upon complete reduction produce paraffinic hydrocarbons having a straight chain configuration. Although any source containing $C_9$—$C_{18}$ n-paraffins may be utilized in this invention, the preferred source is a kerosene boiling range fraction boiling in a range from about 170° C. to about 300° C., and containing the desired $C_9$—$C_{18}$ paraffins.

All of the foregoing enumerated n-paraffin sources have a significant amount of branched chain isomers in admixture with the n-paraffins which must be separated if said paraffin is to be utilized as an intermediate in the preparation of linear sec-alkyl sulfates. These n-paraffins may be separated by any of the procedures known to the art, the exact method of separation not being critical to this invention, such processes including molecular sieve sorbents or urea adduction. The separation processes involving molecular sieves are characterized by the utilization of a zeolite structure in a crystalline alumino-silicate containing pores of about five Angstroms in cross-sectional diameter which are of sufficient size to permit the entry of n-aliphatic compounds, but are not of sufficient size to permit the entry of branched chain or cyclic compounds. As a result, when a mixture containing n-aliphatics is passed over these sieves, the linear aliphatic compounds are selectively sorbed and recovered. These processes, some of which are further exemplified by U.S. Pat. Nos. 2,985,589, 3,274,099, and 3,310,486, are well known to the art.

While the use of molecular sieves is the preferred separation means, another applicable separating agent is urea, a compound which forms an adduct or clathrate with straight-chain compounds. This separation is typically accomplished by mixing urea with a hydrocarbon fraction containing n-paraffins, thereby forming a crystalline adduct with the normal components, recovering the crystals, and freeing the normal hydrocarbons by heating the crystals or by displacement with a preferentially sorbed compound such as an alcohol, aldehyde or other aliphatic compound containing a polar radical.

The $C_9$—$C_{18}$ sulfatable compounds which may be utilized within this invention include the corresponding monohalogenated paraffins, especially the monochlorinated and monobrominated paraffins, monohydroxyl alcohols and mono-olefins. The art of monochlorinating or brominating a paraffinic hydrocarbon is well known in the prior art and further reference thereto may be had for specific details of the process technique. The techniques generally involve reacting the paraffin under carefully controlled conditions designed to insure selective monohalogenation, with minimum formation of polyhalides. The reactions are generally carried out by contacting bromine or chlorine with excess normal paraffin. Catalytic agents are often employed, such as diffused sunlight, light of a specific wavelength, e.g. artificial ultraviolet light, or trace amounts of iodine. These monohalogenated paraffins consist of a mixture of the various linear isomers with the internal halogenated isomers being more prevalent. These sulfatable monohalogenated paraffins may be further converted to other sulfatable compounds such as the corresponding alcohol by hydrolyzing the paraffin, or to a linear olefin by dehydrohalogenating the halogenated paraffin, both of which reactions are familiar to those trained in the art and need no further exemplification.

The process of this invention is particularly applicable to the sulfation of mono-olefins. These mono-olefins may be derived by the cracking of long chain saturated paraffins, dehydrohalogenation of the aforementioned monohalogenated paraffins or by the selective dehydrogenation of the corresponding linear paraffins.

The selective dehydrogenation of the n-paraffins yields a mixture of the corresponding internal olefin isomers and is typically effected by processes which include contacting the n-paraffin with a dehydrogenation catalyst containing a support having an alkali metal compound thereon and promoted with a metal and metal compounds of the Groups VI and VIII of the Periodic Table. Other catalysts suitable for the dehydrogenation of straight chain paraffins to form straight chain mono-olefins comprise refractory spacing agents or carriers selected from the group consisting of activated alumina, magnesia, silica and diatamaceous earth and minor amounts of the metal and/or metallic oxides of elements selected from members of Groups IV B, V B, and VI B, Group VIII, and Group IB of the Periodic Table (E. H. Sargent & Co., 1964) and include titanium, zirconium, hafnium, and vanadium, niobium, and tantalum; chromium, molybdenum, and tungsten; iron, cobalt, nickel, platinum, palladium, copper, silver, and the like, including mixtures of the foregoing. Usually, non-acidic catalysts are desirable since they minimize the amount of isomerization of the n-paraffins or resulting mono-olefins to their branched chain analogs.

Especially preferred are those processes which contact the n-paraffin with a catalytic composite of alkalized alumina, a Group VIII metallic component, and a metallic component of arsenic, antimony, bismuth and compounds thereof, at dehydrogenating conditions including a temperature of about 400° C. to about 600° C., operating pressures of about 10 psig. to about 100 psig., a mole ratio of hydrogen to liquid hydrocarbon charge of less than 15:1 and a liquid hourly space velocity of above 12.0. Typically, these dehydrogenation processes have conversions from about 5 percent to about 25 percent and selectivities of greater than 90 percent. Higher conversions are possible but impractical because of undesired side reactions which lower selectivity. The resultant dehydrogenation effluent may be separated to recover the linear mono-olefins from the unreacted n-paraffins, but since the sulfation is to take place in the presence of a $C_9$—$C_{18}$ n-paraffin, it is more practical and feasible to sulfate the olefin in the presence of the undehydrogenated paraffin, thus eliminating intermediate separation. This same principle applies to those processes wherein the paraffin is first monobrominated or chlorinated to form a sulfatable compound. Thus, the unreacted n-paraffin remaining after the formation of the sulfatable olefin or halogen is readily recoverable after the sulfation and neutralization and may be recycled and converted to additional sulfatable compound. The process of this invention may also be utilized in the sulfation of terminal or alpha mono-olefins since the sulfation is governed by the well known Markownikoff rule, thus forming exclusively sec-alkyl sulfates from such olefins.

The sulfating agents applicable within this invention include those compounds capable of forming the carbon to oxygen to sulfur bonds necessary for the formation of an alkylsulfate. This is to be distinguished from the alkylsulfonates which are characterized by the presence of carbon to sulfur to oxygen bonds. The particular sulfating agents to be utilized are a function of the sulfatable compound to be sulfated. These sulfating agents are well known to those trained in the art and include sulfur trioxide and chlorosulfonic acid for the sulfation of alcohols; and sulfuric acid or sulfuric acid salts for the sulfation of alkylhalides or olefins. Also commonly utilized are the various strengths of oleum and sulfur trioxide. The exact choice of sulfating agent depends upon the sulfatable feed and the end-product application of the alkylsulfate. For example, a different choice of sulfating agents is required when free alcohol is required to optimize foam volume and stability, or, when low salt content is required for relatively high activity and low viscosity or, further, when a high salt content is desired to increase the detergency of the final formulation.

Sulfation can be accomplished by either batch or continuous operations, the ultimate choice again depending on the sulfating agent employed and product quality desired. These methods are also well documented in the prior art and reference thereto may be had for specific details. The amount of n-paraffin present, the essence of this invention, is that amount required to extract the alkyl-sulfate from the acid while leaving the color-bodies in the acid phase. This amount typically is in the range of about 20 percent to about 96 weight percent of the n-paraffin-sulfatable compound mixture passed to the sulfation zone. This concentration includes that concentration of unconverted n-paraffins present in the monohalogenation or dehydrogenation reaction effluent. It is to be emphasized that the $C_9$—$C_{18}$ n-paraffin present in the sulfation and neutralization stops need not be "carried over" from the previous steps and may be commingled with pure sulfatable compound being passed to the sulfation reaction. Of the operating variables, temperature is the most single important variable. It is desirable to sulfate at as low a temperature as possible to minimize undesirable side reactions such as the formation of color and odor bodies as well as aldehydes and ethers. The lower limit of operating temperatures is that at which the reactants and $C_9$—$C_{18}$ n-paraffins, crystallize from the reaction, and typically include temperatures of about −20° C. to 40° C. Generally, an excess of sulfating agent is to be employed to minimize the formation of dialkyl sulfates. Such reactant proportions, sulfating agent strength, and reaction times are well known to the art and reference may be had thereto for further details.

The color bodies produced during the sulfation of the sulfatable compound not only include those formed by reactions involving impurities present in the sulfatable compound formed during its production or subsequent thereto and/or impurities within the sulfating agent but, also, by undesirable side reactions between the sulfatable compound and the sulfating agent. These side reactions can be minimized but not eliminated by manipulation of operating variables. Thus, inevitably some color bodies are formed which must be ultimately removed. Since the process of this invention selectively removes the alkyl sulfate from the color bodies formed during sulfation, minor upsets in operating variables will not have as adverse an effect on product quality as heretofore available in the art. In other words, the process is not as sensitive to operating variables in respect to color bodies being present in the final product as the prior art processes.

Further, if sec-alcohols are a desired product as a detergent intermediate, they may be produced by the process of this invention by hydrolyzing the alkyl sulfate-containing paraffin layer from the sulfation reaction by methods known to the art to form the sec-alcohol, such as alkaline hydrolysis. In turn, these alcohols may be recovered and converted to other detergents by oxyalkylation or a combination of oxyalkylation and sulfation.

The alkylsulfuric ester produced in the sulfation reaction is neutralized to form a water-soluble sec-alkylsulfate detergent, preferably, with an alkaline salt of potassium, sodium, lithium or magnesium, with sodium being especially preferred. These alkaline bases are preferably utilized in aqueous solutions and include aqueous solutions of the corresponding hydroxides and carbonates. Other basic compounds which may be utilized in this invention include the ammonia and the basic ammonium compounds and the lower molecular weight amines. Neutralization conditions are well known to the art and typically include temperatures below 50° C. Higher temperatures are usually undesirable since they induce decomposition of the alkylsulfate as well as hydrolysis of the sulfate.

The neutralized alkyl sulfuric salts may be recovered by methods known to those trained in the art including steam distillation of the neutralized mixture, spray drying, drum drying, etc. Typically, the alkyl acid sulfate is neutralized with aqueous sodium hydroxide, thus extracting the water soluble neutralized salt from the n-paraffin phase to the aqueous phase. The resultant aqueous solution is dried by methods known to the art thereby recovering dry, inorganic salt-free, colorless detergent. The n-paraffin recovered from the neutralization step may be recycled to be admixed with the sulfatable compound being passed to the sulfation step or, more typically, back to the step wherein n-paraffins are first converted to sulfatable compounds such as monohalogenated paraffins or mono-olefins.

The sulfation of the sulfatable compound and subsequent neutralization in the presence of $C_9$—$C_{18}$ n-paraffin serves a multi-fold purpose. Not only does it create a process not requiring intermediate separation of the $C_9$—$C_{18}$ sulfatable compound and the n-paraffin from which it was derived, but it also provides a process that is more readily operable in the sulfation step, and that produces a relatively color-free product not heretofore available in the art. This concept of reacting in the presence of $C_9$—$C_{18}$ n-paraffin may also be utilized by commingling the paraffin with sulfatable compounds derived or procured from other sources and is not to be limited to sulfation in the presence of the n-paraffin from which the sulfatable compound was derived.

The actual presence of the paraffin in the sulfation process serves first as a heat sink for the exothermic sulfation reaction and, secondly, as a "diluent" to insure uniformity within the reaction and lower the viscosity, rendering the mixture more amenable to agitation. Thirdly, the alkylsulfate formed in the sulfation reaction is removed from the acid phase into the n-paraffin phase leaving the majority of the color bodies in the acid phase. The importance of this feature is obvious. First of all, the presence of all the alkylsulfate formed in the sulfation reaction within the n-paraffin phase reduces the amount of base necessary to neutralize the alkyl acid sulfate heretofore available in processes wherein the spent sulfating agent and alkylsulfate are neutralized together; secondly, it renders an alkylsulfate upon neutralization free from the inorganic salt of the sulfating agent. Most importantly, the great majority of the color bodies formed within the sulfation reaction remain in the acid phase yielding a relatively color-free paraffin phase which upon neutralization yields a detergent with much improved color characteristics over those heretofore available without the use of extraneous purification methods.

The process of the present invention is further described in the following illustrative examples which are, however, not presented for the purpose of limiting the scope of the invention, but for purposes of further illustrating the embodiments of the present process.

EXAMPLE I

A straight-run petroleum fraction (recovered from a Michigan crude oil), boiling within the range of from about 170° to about 225° C. and having the following composition, according to the general classes of the hydrocarbons present:

| | Wt. Percent |
|---|---|
| $C_{10}$–$C_{15}$ aliphatic paraffins | 73 |
| $C_9$–$C_{15}$ naphthenes | 24 |
| $C_8$–$C_{15}$ aromatics | 3 | is resolved into the following two classes of components: (1) straight-chain or normal paraffins and (2) a mixture of isoparaffinic and cyclic hydrocarbons. The recovered normal paraffins are thereafter dehydrogenated to their mono-olefin analogs and these are thereafter sulfated, followed by neutralization of the resulting acid sulfates to the alkyl-sulfate salt, a water-soluble, biodegradable or "soft" detergent.

In the first step of the reaction sequence, the normal paraffins in the straight-run fraction are separated therefrom by contacting the mixture with pelleted alumino-silicate molecular sieves which selectively sorb the normal paraffinic components of the mixture and leave a non-sorbed raffinate consisting of isoparaffins and the cyclic hydrocarbons present in the fraction. For effecting this separation, the straight-run kerosene fraction is poured at room temperature (25° C.) into a vertical column packed with the molecular sieve pellets; the resulting column is 5 ft. in length and contains 3.8 ft. of the pellets, each having a dimension of approximately ⅛ × ⅛. A raffinate effluent from the bottom of the column of molecular sieves consists of n-paraffin-free hydrocarbons. The normal paraffin components of the kerosene fraction (about 37 percent of the total volume of kerosene) remain within the column, sorbed on the molecular sieve particles. The residual raffinate retained on the surface of the pellets is washed from the column by pumping isopentane into the top of the column and draining the effluent from the bottom. Any isopentane remaining on the pellet surfaces is separated from the recovered n-paraffin sorbate product by distillation. Raffinate contained in the wash effluent is recovered as bottoms on distillation of the wash effluent.

After completely draining the column of isopentane wash, the n-paraffins sorbed from the kerosene feed stock are desorbed by filling the column with liquid n-pentane at 25° C., allowing the n-pentane to displace by the mass action effect the kerosene-derived n-paraffins present in the pores of the molecular sieve particles, and after 10 minutes the liquid surrounding the sorbent particles is drained into a distillation flask. The column is again filled with n-pentane and after standing for an additional 10 minutes, the liquid in the column is drained into a second distillation flask. Distillation of the n-pentane from the effluent stream in each case left a residue of kerosene n-paraffins (98.5 percent normal components of $C_{11}$—$C_{15}$ chain length) in each flask, 96 percent of the total recovered sorbate being in the first flask. The resultant n-paraffins are then further fractionated to obtain a $C_{12}$ (dodecane) fraction containing 99.4 percent dodecane and 0.6 percent isomers.

The recovered $C_{12}$ n-paraffin is thereafter dehydrogenated by passing the paraffin in admixture with hydrogen at an 8:1 hydrogen to paraffin mole ratio to a small pilot plant reactor maintained at isothermal conditions of 475° C. and 15 psig. The feedstock charge rate (in terms of liquid hourly space velocity) is 30 volumes of paraffin charge per volume of catalyst per hour. The catalyst packed in the pilot plant reactor is an arsenic-lithiated platinum catalyst containing 0.75 wt. percent platinum on alumina, 0.47 arsenic to platinum mole ratio and 0.5 wt. percent lithium. The product effluent is cooled and normal gaseous components removed to provide a liquid product containing 11.1 wt. percent docecenes, 87.8 wt. percent dodecane and small amounts of diolefins and aromatics.

The liquid product containing the $C_{12}$ mono-olefin and paraffin is placed in an agitated flask and cooled to 0° C. in a crushed ice bath as sulfuric acid of 98 percent concentration is gradually added, with stirring, to provide a weight ratio of acid to olefins of 2.0. This mixture is maintained at 0° C. and agitated for 40 minutes. The mixture is then allowed to settle and three separate layers form, a light yellow colored top hydrocarbon phase, a black acid middle phase, and a very small, clear yellow bottom phase. The top hydrocarbon phase is passed into an equal volume of water, also maintained at 0° C, with the resulting mixture being completely colorless. This mixture is maintained at 0° C. and neutralized to a phenolphthalein end point with a 10 wt. percent aqueous solution of sodium hydroxide. The mixture is allowed to settle to form an upper hydrocarbon phase and a lower aqueous phase containing the neutralized alkyl sulfate. This lower phase is separated and dried to yield an essentially all white detergent product essentially free from inorganic salts. A portion of the hydrocarbon phase is also evaporated leaving practically no residue, showing the substantial absence of alkylsulfate. This hydrocarbon phase contains 95.1 percent $C_{12}$ n-paraffin and 4.9 percent unreacted olefin, thus, indicating a conversion of 56 percent of the original olefin. The two lower phases are also diluted with water, neutralized, and evaporated to dryness to form a dark, discolored solid. This solid is extracted with ethanol, with the ethanol upon evaporation yielding little residue, thus, indicating that essentially all of the alkyl sulfate is in the original hydrocarbon phase present upon the completion of the sulfation reaction.

Dodecenes obtained by the removal of the admixed dodecane were sulfated in the same manner as the dodecane-dodecene mixture except that upon completion of the reaction, a single dark-brown solution resulted which upon neutralization and drying yielded a yellow alkyl sulfate-sodium sulfate mixture.

EXAMPLE II

A run somewhat similar to Example I is performed utilizing the entire $C_{11}$—$C_{15}$ n-paraffin mixture. This mixture of homologs is dehydrogenated and the resultant olefins sulfated in the same manner as the dodecane-dodecene mixture of Example II except that the hydrocarbon phase, after being separated from the acid phase is further reacted in the same manner with fresh 98 percent sulfuric acid to insure more complete reaction of the olefins. The hydrocarbon phase of this reaction is neutralized in the same manner as in Example II and yields a white inorganic salt-free detergent of equivalent quality to that formed in Example I from the dodecane-dodecene mixture. The converted n-paraffins are dried and blended with the $C_{11}$—$C_{15}$ paraffin passed to the dehydrogenation reaction.

In the foregoing, the n-paraffins were dehydrogenated over a arsenic-lithiated catalyst containing 0.75 wt. percent platinum on alumina, 0.47 arsenic to platinum mole ratio and 0.5 wt. percent lithium. This catalyst is a member of those particularly preferred catalytic composites of alumina containing from about 0.01 percent to about 1.5 percent by weight lithium, from about 0.05 percent to about 5.0 percent by weight of a Group VIII noble metal component and a metallic component selected from the group consisting of arsenic, antimony, bismuth and compounds thereof in an atomic ratio to said Group VIII component of from about 0.20 to about 0.50.

CONCLUSIONS

From the foregoing specification and examples, the beneficial import of the process of this invention is readily apparent to those trained in the art. This process offers a means of converting $C_9$—$C_{18}$ n-paraffins to sec-alkyl sulfates without involving the intermediate separation of the paraffin from the intermediate sulfatable compounds formed from the n-paraffins. Further, this process makes possible the formation of sec-alkyl sulfate detergent free from inorganic salts, thus, alleviating the necessity of extracting such salts, heretofore practiced by the prior art. If such salts are desired in the final detergent composition as required by a specific application, this process offers a method by which the amount of inorganic salt may be carefully controlled. Most importantly, this process offers a means for producing a linear sec-alkyl sulfate free from undesirable color-bodies without involving sophisticated bleaching and separation techniques.

We claim as our invention:

1. A process for producing a linear sec-alkyl-sulfate essentially free from inorganic salts and color-bodies formed during sulfation, which comprises the steps of:

a. dehydrogenating a $C_9$—$C_{18}$ n-paraffin to form linear $C_9$—$C_{18}$ mono-olefin, recovering therefrom linear $C_9$—$C_{18}$ mono-olefin in admixture with unreacted $C_9$—$C_{18}$ n-paraffin, said unreacted $C_9$—$C_{18}$ n-paraffin being present in an amount of from about 20 to about 96 weight percent of the admixture;

b. sulfating said $C_9$—$C_{18}$ mono-olefin in admixture with said unreacted $C_9$—$C_{18}$ n-paraffin to form a $C_9$—$C_{18}$ alkyl acid sulfuric ester with an acid sulfating agent selected from the group consisting of sulfuric acid and oleum, said sulfating agent being present in an amount in excess of the stochiometric quantity required to sulfate said $C_9$—$C_{18}$ mono-olefin, whereby said unreacted n-paraffin serves as a heat sink and diluent and also serves to extract the $C_9$—$C_{18}$ alkyl acid sulfuric ester from the excess sulfating agent, and whereby excess sulfating agent serves to extract color-bodies formed during sulfation from the unreacted $C_9$–$C_{18}$ n-paraffin and sulfated $C_9$–$C_{18}$ monoolefin;

c. separating the resultant sulfation step effluent into a hydrocarbon phase containing $C_9$–$C_{18}$ alkyl acid sulfuric ester and unreacted $C_9$–$C_{18}$ n-paraffin, and an acid phase containing excess sulfating agent and the majority of color-bodies formed during the sulfation reaction;

d. neutralizing the hydrocarbon phase by admixing said phase with an aqueous solution, of a base selected from the group consisting of ammonia and the hydroxides and carbonates of sodium, potassium, lithium and magnesium, to form a $C_9$–$C_{18}$ neutralized alkyl sulfuric ester;

e. forming from the effluent of step (d) a hydrocarbon phase containing unreacted $C_9$–$C_{18}$ n-paraffin, and an aqueous phase containing $C_9$–$C_{18}$ neutralized alkyl sulfuric ester;

f. separating the phases formed in step (e);

g. drying the aqueous phase to yield sec-alkyl-sulfate; and, h. recycling at least a portion of the unreacted $C_9$–$C_{18}$ n-paraffin of the separated hydrocarbon phase of step (e) to dehydrogenation step (a).

2. The process of claim 1 further characterized in that the neutralization is effected utilizing aqueous sodium hydroxide.

3. The process of claim 1 further characterized in that said n-olefin is from about 5 percent to about 15 percent by weight of said dehydrogenation effluent, sulfuric acid is employed as a sulfating agent, and sulfation conditions including a temperature of from about $-20°$ C. to about $+20°$ C. are employed.

4. The process of claim 1 further characterized in that said $C_9$–$C_{18}$ n-paraffin is dehydrogenated by contacting with a catalytic composite of alumina containing from about 0.01 percent to about 1.5 percent by weight lithium, from about 0.05 percent to about 5.0 percent by weight of a Group VIII noble metal component and a metallic component selected from the group consisting of arsenic, antimony, bismuth, and compounds thereof in an atomic ratio to said Group VIII component of from about 0.20 to about 0.50, at dehydrogenation conditions including a temperature of from about 400° C. to about 500° C. and a liquid hourly space velocity of at least 12.0.

* * * * *